US009268594B2

(12) United States Patent
Shanbhogue et al.

(10) Patent No.: US 9,268,594 B2
(45) Date of Patent: *Feb. 23, 2016

(54) PROCESSOR EXTENSIONS FOR EXECUTION OF SECURE EMBEDDED CONTAINERS

(71) Applicant: Intel Corporation, Santa Clara, CA (US)

(72) Inventors: Vedvyas Shanbhogue, Bee Cave, TX (US); Arvind Kumar, Beaverton, OR (US); Purushottam Goel, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/730,224

(22) Filed: Jun. 3, 2015

(65) Prior Publication Data

US 2015/0293777 A1    Oct. 15, 2015

Related U.S. Application Data

(63) Continuation of application No. 12/347,890, filed on Dec. 31, 2008, now Pat. No. 9,086,913.

(51) Int. Cl.
*G06F 9/455* (2006.01)
*G06F 9/48* (2006.01)
(Continued)

(52) U.S. Cl.
CPC .......... *G06F 9/45558* (2013.01); *G06F 9/4812* (2013.01); *G06F 9/5077* (2013.01); *H04L 9/3242* (2013.01); *H04L 63/168* (2013.01); *G06F 2009/45579* (2013.01);
(Continued)

(58) Field of Classification Search
None
See application file for complete search history.

(56) References Cited

U.S. PATENT DOCUMENTS 4,843,541 A    6/1989    Bean et al.
6,253,224 B1   6/2001    Brice et al.
(Continued)

FOREIGN PATENT DOCUMENTS

CN    1215863 A    5/1999
CN    1702622 A    11/2005
(Continued)

OTHER PUBLICATIONS

Figueiredo, et al., "A Case of Grid Computing on Virtual Machines," IEEE, May 2003, pp. 1-10.
(Continued)

*Primary Examiner* — H S Sough
*Assistant Examiner* — Carina Yun
(74) *Attorney, Agent, or Firm* — Mnemoglyphics, LLC; Lawrence M. Mennemeier

(57) ABSTRACT

Methods and apparatus relating to processor extensions for execution of secure embedded containers are described. In an embodiment, a scalable solution for manageability function is provided, e.g., for UMPC environments or otherwise where utilizing a dedicated processor or microcontroller for manageability is inappropriate or impractical. For example, in an embodiment, an OS (Operating System) or VMM (Virtual Machine Manager) Independent (generally referred to herein as "OI") architecture involves creating one or more containers on a processor by dynamically partitioning resources (such as processor cycles, memory, devices) between the HOST OS/VMM and the OI container. Other embodiments are also described and claimed.

31 Claims, 9 Drawing Sheets

(51) Int. Cl.
*G06F 9/50* (2006.01)
*H04L 9/32* (2006.01)
*H04L 29/06* (2006.01)

(52) U.S. Cl.
CPC ............. *Y02B 60/142* (2013.01); *Y02B 60/144* (2013.01); *Y02B 60/167* (2013.01)

(56) References Cited

U.S. PATENT DOCUMENTS

| | | | |
|---|---|---|---|
| 6,381,682 | B2 | 4/2002 | Noel et al. |
| 6,691,146 | B1 | 2/2004 | Armstrong et al. |
| 6,708,272 | B1 | 3/2004 | McCowen et al. |
| 6,892,383 | B1 | 5/2005 | Arndt |
| 7,003,771 | B1 | 2/2006 | Arndt |
| 7,096,469 | B1 | 8/2006 | Kubala et al. |
| 7,139,855 | B2 | 11/2006 | Armstrong et al. |
| 7,206,819 | B2 | 4/2007 | Schmidt |
| 7,296,267 | B2 | 11/2007 | Cota-Robles et al. |
| 7,428,485 | B2 | 9/2008 | Armstrong et al. |
| 7,484,210 | B2 | 1/2009 | Lewites et al. |
| 7,565,398 | B2 | 7/2009 | Ashok et al. |
| 8,468,356 | B2 | 6/2013 | Sahita et al. |
| 2002/0016892 | A1 | 2/2002 | Zalewski et al. |
| 2002/0087611 | A1 | 7/2002 | Tanaka et al. |
| 2002/0129127 | A1 | 9/2002 | Romero et al. |
| 2002/0156824 | A1 | 10/2002 | Armstrong et al. |
| 2002/0161891 | A1 | 10/2002 | Higuchi et al. |
| 2003/0055864 | A1 | 3/2003 | Armstrong et al. |
| 2004/0117318 | A1* | 6/2004 | Grawrock ............... G06F 21/57 705/66 |
| 2004/0148605 | A1 | 7/2004 | Kim |
| 2005/0022192 | A1 | 1/2005 | Kim |
| 2005/0039183 | A1 | 2/2005 | Romero et al. |
| 2005/0259678 | A1 | 11/2005 | Gaur |
| 2005/0278722 | A1 | 12/2005 | Armstrong et al. |
| 2006/0080553 | A1 | 4/2006 | Hall |
| 2006/0088167 | A1* | 4/2006 | Bade ....................... G06F 21/57 380/281 |
| 2006/0143687 | A1 | 6/2006 | O'Connor et al. |
| 2006/0174077 | A1 | 8/2006 | Abadi et al. |
| 2006/0190243 | A1 | 8/2006 | Barkai et al. |
| 2006/0206887 | A1 | 9/2006 | Dodge et al. |
| 2006/0256108 | A1* | 11/2006 | Scaralata ............... G06F 21/57 345/418 |
| 2006/0272027 | A1 | 11/2006 | Noble |
| 2007/0006175 | A1 | 1/2007 | Durham et al. |
| 2007/0028244 | A1 | 2/2007 | Landis et al. |
| 2007/0067366 | A1 | 3/2007 | Landis |
| 2007/0094719 | A1* | 4/2007 | Scarlata ................. G06F 21/53 726/9 |
| 2007/0192761 | A1 | 8/2007 | Sahita et al. |
| 2007/0192854 | A1 | 8/2007 | Kelley et al. |
| 2007/0266037 | A1 | 11/2007 | Terry et al. |
| 2008/0059811 | A1 | 3/2008 | Sahita et al. |
| 2008/0114916 | A1 | 5/2008 | Hummel et al. |
| 2009/0038017 | A1* | 2/2009 | Durham ............... G06F 12/1408 726/27 |
| 2009/0172438 | A1 | 7/2009 | Kumar |
| 2009/0323941 | A1 | 12/2009 | Sahita |
| 2009/0327367 | A1* | 12/2009 | Mehra ................... G06F 3/0619 |

FOREIGN PATENT DOCUMENTS

| | | |
|---|---|---|
| CN | 1801091 A | 7/2006 |
| EP | 0179401 B1 | 7/1992 |
| EP | 1679632 A2 | 7/2006 |
| JP | 2006065851 A | 3/2006 |
| JP | 2007510198 A | 4/2007 |
| WO | 2005036405 A1 | 4/2005 |
| WO | 2007027739 A1 | 3/2007 |
| WO | 2009069136 A2 | 6/2009 |
| WO | 2010078143 A2 | 7/2010 |
| WO | 2010078143 A3 | 8/2010 |

OTHER PUBLICATIONS

MSDN, "Key Blobs", Apr. 8, 2004, <http://msdn.microsoft.com/en-us/library/ms884374.aspx>, 3 pages.

International Preliminary Report on Patentability and Written Opionion received for PCT Patent Application No. PCT/US2009/069136, mailed Jul. 14, 2012, Korean Intellectual Property Office, Republic of Korea, 5 pages.

International Search Report and Written Opinion received for Patent Application No. PCT/US2009/069136, mailed on Jun. 29, 2010, 10 pages.

Tan, "Home PC Maintenance with Intel AMT", Intel Technology Journal, vol. 11, Issue 1, Feb. 15, 2007, pp. 57-66.

* cited by examiner

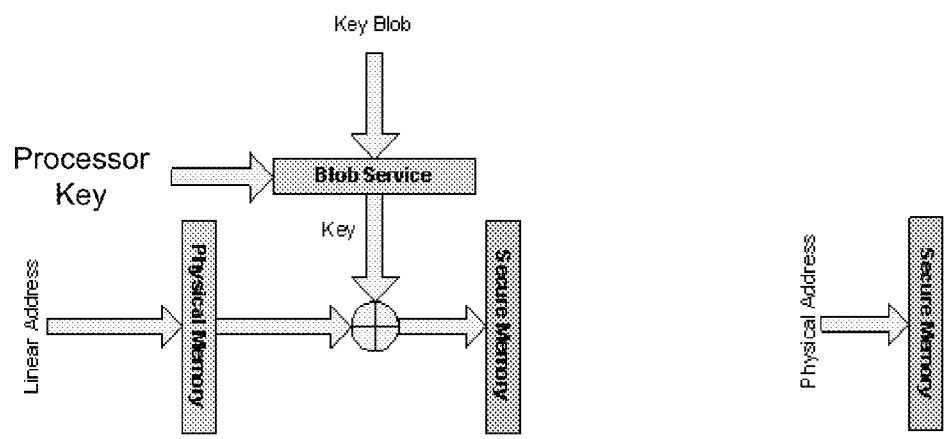
FIG. 13
FIG. 14
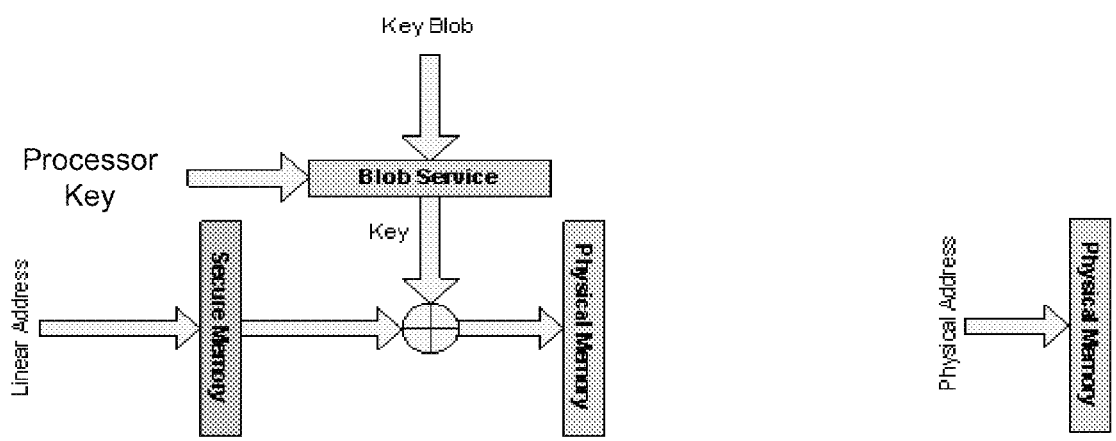
FIG. 15
FIG. 16

PROCESSOR EXTENSIONS FOR EXECUTION OF SECURE EMBEDDED CONTAINERS

CLAIM TO PRIORITY

This is a Continuation of application Ser. No. 12/347,890, filed Dec. 31, 2008, currently pending.

FIELD OF THE DISCLOSURE

The present disclosure generally relates to the field of electronics. More particularly, an embodiment of the invention relates to processor extensions for execution of secure embedded containers.

BACKGROUND OF THE DISCLOSURE

A computer system may be implemented as a layered device, for example, including a hardware layer, a firmware and operating system layer, and an applications program layer. The hardware layer of the computer system may be referred to as a physical platform. The physical platform may include processors, chipsets, communications channels, memory, boards, and systems.

The computer system may also include a manageability engine, for example, including a microcontroller that is dedicated to allowing the computer system to be managed, e.g., remotely via a remote management console over a communications network. However, provision of a dedicated microcontroller for manageability services may be inappropriate, impractical, or otherwise not scalable in some implementations for reasons including cost, size, power consumption, heat dissipation, limited MIPS (Million Instructions Per Second), etc.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 13 and 14 illustrate block diagrams of operations associated with utilizing a load key, according to some embodiments.

FIGS. 15 and 16 illustrate block diagrams of operations associated with utilizing a store key, according to some embodiments.

DETAILED DESCRIPTION

Figure 1:
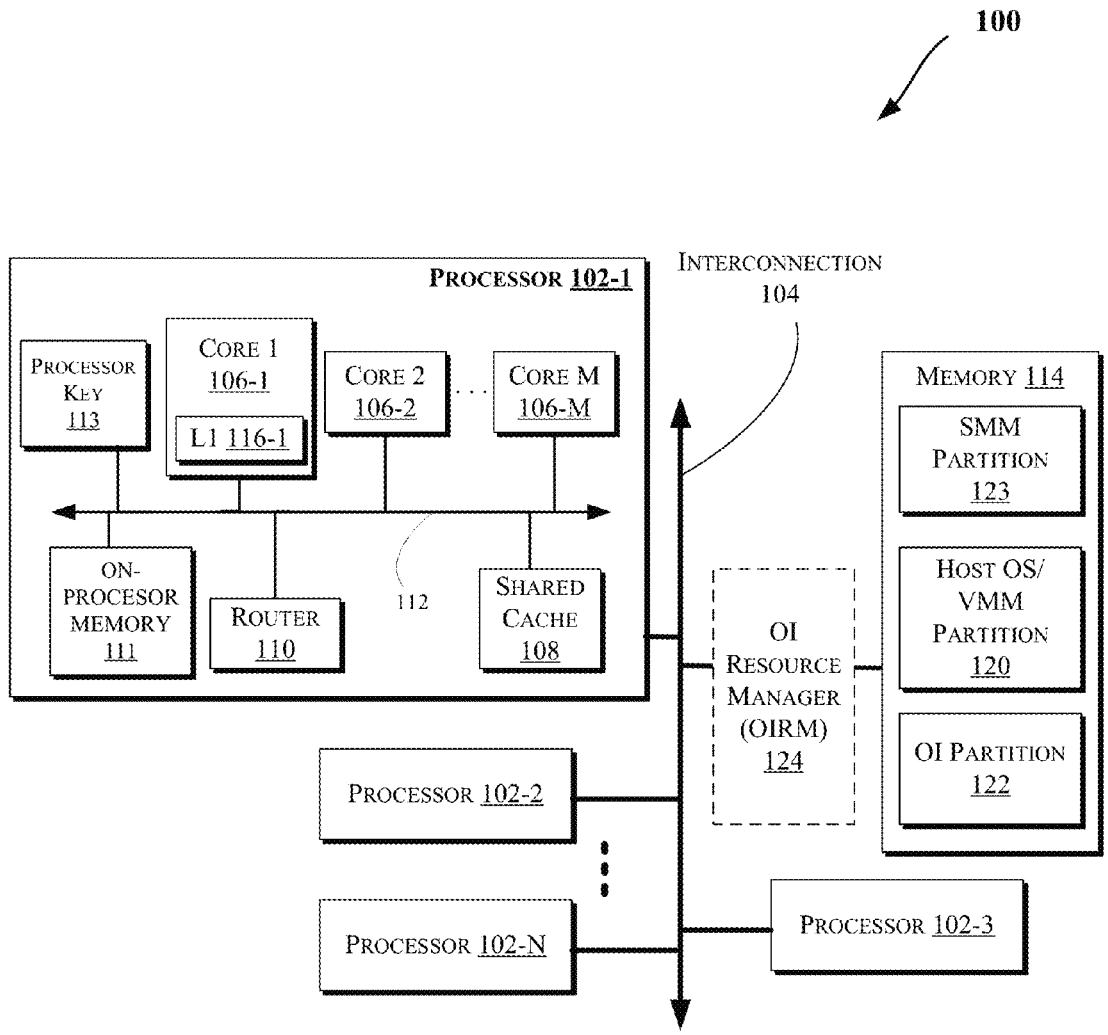
FIGS. 1, 18, and 19 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof. Additionally, the use of "instruction" or "micro-operation" (which may also be referred to as "uop") herein may be interchangeable. Also, even though some embodiments discussed herein may refer to a set or clear value as logical 0 and 1, respectively, these terms are interchangeable, e.g., depending on the implementation.

Some processors may include multiple processing cores. In addition to the multiple cores, a processor die may include an uncore (which may collectively refer to all elements on the processor die other than the core(s)). To improve performance, more and more functionality may be incorporated into the uncore of processors, e.g., by replacing multiple chipsets. For example, some implementations may build the memory controller functions, the IO (Input Output) controller functions, and graphics functions into the uncore. However, this trend has an impact on other functions or services delivered on platforms, for example manageability. Currently, some manageability functions may be delivered on a dedicated processor which may constitute the core part of a Manageability Engine (ME). ME is generally located on a chipset. Also, some server platforms may implement a discrete dedicated microcontroller called a Baseboard Management Controller (BMC), a Service Processor (SP), or by any other name. As previously discussed, these solutions are not scalable for reasons such as cost, size, power consumption, heat dissipation, limited MIPS, etc. This becomes even more of a problem in Ultra-Mobile Personal Computer (UMPC) environments, and forces a need for a different solution.

To this end, some embodiments disclosed herein provide scalable solutions for manageability function, e.g., for UMPC environments or otherwise where utilizing a dedicated processor or microcontroller for manageability is inappropriate or impractical. For example, in an embodiment, an OS (Operating System) or VMM (Virtual Machine Manager) Independent architecture (collectively referred to herein as "OI") involves creating one or more containers, e.g., on a processor, by dynamically partitioning resources (such as processor cycles, memory, devices) between the HOST OS/VMM and the OI container. In one embodiment, an OI Resource Manager (OIRM) may perform time sharing operations between the HOST OS/VMM container (also referred to herein as partition) and the OS Independent container. As a result, some embodiments allow idle processor cycles to be used for a useful purpose (e.g., manageability) without impacting (or with reduced impact on) OS/VMM execution performance.

In an embodiment, techniques for handling interrupts originating from devices assigned to OI and injecting these interrupts into an OI partition are disclosed. In one embodiment, tamper resistant memory is provided for handling security sensitive data in OI. In an embodiment, the amount of time that needs to be spent in transitioning from S3 to S0 and from S0 to S3 is reduced. Moreover, techniques described herein may allow for improved performance, efficiency, and/or security in various computing devices, such as those discussed for example with reference to FIGS. 1-19.

More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components, some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 18-19), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1. In one embodiment, the processor 102-1 may have an embedded key 113 accessible only to OIRM 124 for use in cryptographic operations. In one embodiment, this key may be generated and stored on the processor by the OIRM using a strong random number generator on first power-up of the processor. In another embodiment, this key may be stored into the processor at manufacturing.

The shared cache 108 may store data (e.g., including instructions) that are utilized by one or more components of the processor 102-1, such as the cores 106. As shown, processor 102 may also include on-processor (also referred to herein as "on-package") memory 111 (which may be used as secure memory, as will be further discussed below). For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache (116-1) (generally referred to herein as "L1 cache 116") and/or an L2 cache (not shown).

As shown in FIG. 1, system 100 may utilize one or more partitions (also referred to herein interchangeably as "containers") 120 and 122. An OI Resource Manager (OIRM) 124 may be communicatively coupled between the physical layer (e.g., processor core(s), chipset, memory, storage, network interface, etc.) and the Host OS/VMM and OI containers (or partitions) 120 and 122. Also, more than one OI container may be used. In some embodiments, OIRM 124 may be implemented as microcode or firmware on a processor. For example, OIRM 124 may be the processor microcode that is responsible for scheduling processor cycles. It may also allow the main OS/VMM partition 120 to execute processor instructions interleaved with the processor instructions executed by OI partition 124, e.g., to maintain fairness or system responsiveness to multiple processes executed on the system.

The Host OS/VMM partition 120 may include regular (host) application(s) and/or host device driver(s) (not shown). Also, OI partition 122 may include application(s), data corresponding to core capabilities, and/or OI drivers (e.g., for selected device(s)) (not shown). Furthermore, in some embodiments, the OIRM 124 may have one or more of the below constraints to satisfy when allocating processor time to the OIEE (OI Execution Environment (the operating environment inside the OI partition)):

HOST OS/VMM is not to miss interrupts or suffer time drift and HOST OS/VMM IO devices (e.g., CDROM, LAN, WLAN, etc.) should get serviced in time to avoid underflow or overflow of buffers. This implies that external interrupts and Inter Processor Interrupt destined for HOST OS/VMM are to be delivered with minimal latency.

Scheduling of the OIEE on a processor core is not to lead to blocking of other processors. Such conditions may occur when the operating system is holding a lock on the processor core that was selected for scheduling OI. Taking this processor core away for running OI would cause other processor cores that are waiting for this lock to spin and waste cycles. The algorithm that schedules OI for execution on the processor core should avoid such conditions where possible.

Power management of processor cores, devices, buses, etc. are to be cooperative with the OS rather than interfering with the HOST OS/VMM 120. The OIRM 124 may be made aware of side effects of scheduling decision on power, thermal and performance states of the system. For example, bringing a C-x processor core (associated with processor C states) to C-0 to schedule OI may cause the power envelope of the system to cross thresholds leading to automatic frequency throttling. Thus, this action of selecting a C-x processor core for scheduling though done to avoid performance impact to the C-0 processor cores may inadvertently cause a sever performance penalty. The OIRM 124 may make use of suitable power heuristics available in the core and uncore, e.g., from a PCU (Power Control Unit) to make judicious choices. A PCU may be provided in the processor uncore to manage power management policies for the processor cores and uncore components.

Operating systems and performance monitoring tools may be configured to have an opportunity to detect the number of cycles consumed from a given processor core to execute OI. Providing such observation capabilities may help in debugging the system if any unforeseen behavior is observed to ascertain if it is caused by OI.

In some embodiments, the OI implementations are to provide an execution environment that is unaffected by the state of the HOST OS/VMM. Thus, OIRM may meet one or more of the below requirements in some embodiments:

- Avoid or reduce OI starvation by ensuring OI operation(s)/instruction(s) executes for a minimum guaranteed duration as configured.
- Avoid or reduce pinning OI operation(s)/instruction(s) on any one processor core in the system. OS Independent operation may take cycles from the HOST OS/VMM. Some operating systems and VMM pin workloads (e.g., threads, VMs (Virtual Machines), etc.) in order to achieve throughput goals. Pinning OI to a particular processor core would unfairly penalize any workloads pinned to that processor core by HOST OS/VMM.
- Run on the processor core that has minimal impact to the system performance. The system performance is a mix of the HOST OS/VMM throughput, power consumption and C-state wake latencies. The OIRM may rely on heuristics from the PCU to arrive at optimal decisions on processor core selection for executing OIEE in order to not adversely impact the system performance along any of these vectors.

Figure 2:
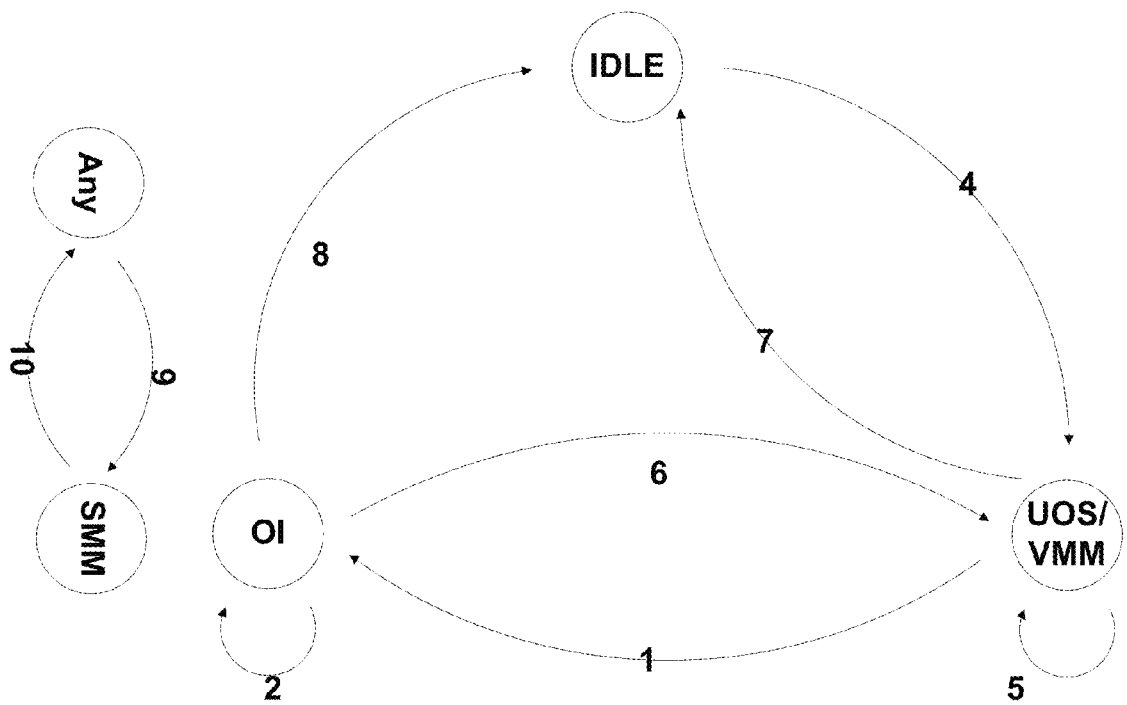
FIG. 2 is a state transition diagram illustrating four states and triggers that cause the transitions from one state to another, accordingly to an embodiment.

FIG. 2 is a state transition diagram illustrating four states and triggers that cause the transitions from one state to another, accordingly to an embodiment. Moreover, based on above requirements, one may refer to the illustrated state transition of a processor core. A processor core may exist in one of the below modes in accordance with some embodiments. In an embodiment, the transition of a processor core between these modes is controlled by the OIRM 124.

HOST OS/VMM—The HOST OS/VMM container 120 is active and executing on the processor core.

OI—The processor core is executing one of the OI container(s) 122.

SMM (System Management Mode)—The processor core is executing the SMM container 123. The SMM state may be entered from any state.

IDLE—the HOST OS/VMM as well as the OIEE are in C-x state. The OIRM transitions the processor core to the C state requested by the HOST OS/VMM.

The following Table 1 provides further information regarding each transition shown in FIG. 2 and causes.

TABLE 1

| TRANSITION | START STATE | END STATE | POTENTIAL CAUSE |
|---|---|---|---|
| 1 | HOST OS/VMM | OI | The transition from HOST OS/VMM to OI could be triggered by one of below reasons: 1. Pre-emption timer expiry - indicating expiry of the guard timer 2. HL driver worker thread in HOST OS/VMM yields to schedule OIEE (described later). (described later) |
| 2 | OI | OI | Interrupts arriving for OI containers when the processor core is in OI state are injected into appropriate OIEE depending on their priority. No state transitions occur. |
| 4 | IDLE | HOST OS/VMM | Interrupt event for HOST OS/VMM arrives causing the thread to move from IDLE state to HOST OS/VMM state. Note that HOST OS/VMM interrupts cause notifications to OIRM only when the thread is in IDLE or OIEE mode. When the thread is in HOST OS/VMM mode, the interrupts are delivered directly to HOST OS/VMM without OIRM intervention. |
| 5 | HOST OS/VMM | HOST OS/VMM | Interrupts arriving for OI containers do not pre-empt the HOST OS/VMM. The OIRM notes pending interrupts for OIEE and continues to run the HOST OS/VMM |
| 6 | OI | HOST OS/VMM | The transition from OI to HOST OS/VMM could be triggered by one of below reasons: 1. When OI is scheduled non-preemptively e.g., due to the OI driver initiated scheduling of OIEE, arrival of HOST OS/VMM interrupts cause the OILEE to be pre-empted to resume the HOST OS/VMM processing 2. Expiry of OILEE time slice (preemption timer expiry) 3. OILEE kernel invokes an instruction like HLT indicating it is idle and has no further work to do. |
| 7 | HOST OS/VMM | IDLE | HOST OS/VMM issues an instruction, e.g., HLT (Halt) or MWAIT (Monitor Wait) to transition to a low power idle state. |
| 8 | IDLE | OI | This transition may be triggered by below: 1. Arrival of an interrupt for OIEE 2. Expiry of the pre-emption timer requiring scheduling of OIEE |
| 9 | ANY | SMM | This transition may be triggered by the following: Arrival of an SMI (System Management |

TABLE 1-continued

| TRANSITION | START STATE | END STATE | POTENTIAL CAUSE |
|---|---|---|---|
| | | | Interrupt) in any state causes the thread to switch to SMM mode |
| 10 | SMM | ANY | This transition may be triggered by the following: Issuing a RSM (return from SMM mode) from SMM |

Furthermore, the OIRM 124 may be implemented as a microcode module running on all processor threads. One of the OIRM instances may actively schedule the OIEE for execution on one of the processor cores at any given point in time. The OIRM instance that is actively scheduling OIEE for execution on a processor core may be termed as the "Active" OIRM instance and the other instances may be termed as "standby" OIRM instances herein. In an embodiment, there is only one active instance of OIRM in the system.

Generally, a multiprocessor-capable operating system uses locks to enforce atomicity of certain operations. Critical section code using such locks may be extended due to preemption for executing OI container on the processor core holding the lock. Consequently, other lock contenders could end up spinning until the processor core is returned for execution of HOST OS/VMM; therefore, the spinlock acquisitions could be extended significantly. Scheduling of the OIEE on a processor core should not lead to such undesired spinning of other processor cores on spin locks. The following methods implemented by the architecture(s) discussed herein are to avoid (or at least reduce the likelihood of) such lockup as follows:

(1) Driver Assisted Scheduling—Allow the operating system an opportunity to declare intervals in time where taking the processor core away from the operating system to execute OI operation(s)/instruction(s) is free from such hazards. For example, a driver, e.g., provided in the HOST OS/VMM 120, may assist with this determination. This may be the normal mode of operation where the OIRM notifies the OI driver in HOST OS/VMM (e.g., using an interrupt) to indicate need to schedule OI operation(s)/instruction(s). The driver, e.g., in response to getting scheduled, notifies the OIRM. This notification may be used as a "yield" indication by the OIRM to schedule OI on that processor core. The OIRM allows the OI to execute on that processor core until either OI consumes its cycle allocation or an interrupt/IPI (Inter Processor Interrupt) needs to be delivered to the HOST OS/VMM. This approach leads to the OI execution time being essentially accounted for as the driver execution time and also avoids the high priority lock synchronization related issues.

(2) Autonomous Scheduling—In some situations, the method (1) described above however cannot be entirely relied upon for OI scheduling since: (a) the HOST OS/VMM may be in a non-operational state; (b) the OI driver may have been disabled or not installed; and/or (c) the current workload on HOST OS/VMM may prevent the OI driver from being scheduled. Since the OIRM needs to protect the OIEE from starvation and provide a certain configured minimum execution time, the OIRM may use a guard timer to protect against such abnormal conditions in HOST OS/VMM. The guard timer may be started when the notification in the form of interrupt for the OI driver is delivered to the HOST OS/VMM. If the OI driver does not get scheduled long enough to allocate the configured minimum execution time to OI within this guard time, the OIRM may shift to a pre-emptive mode of operation to satisfy the minimum execution time guarantee made to OIEE. The OIRM may also ensure that the duration for which the HOST OS/VMM is preempted is deterministic and bound to an upper threshold limit.

In accordance with some embodiments, the below parameters may govern time sharing of execution time between HOST OS/VMM and OI:

1. OI-Accounting-Interval—The accounting interval in which the sharing of time between OIEE and HOST OS/VMM is enforced. For example, if the OIEE is configured to use 3% of cycles on a processor core, and the OI-Accounting-Interval is set to 100 ms, then the OIEE shall not execute for more than 3 ms in any given 100 ms interval. The interrupt to the OI driver may be delivered at the start of each accounting interval.

2. OI-Minimum-Share—The minimum processor execution time that may be guaranteed to the OI as a percentage of the OI-Accounting-Interval. The minimum share will be available to the OI in any given accounting interval. However, there is no latency promise and the minimum share may be spread over the entire accounting interval in one or more runs.

3. OI-Normal-Share—Normal share of processor time assigned to OI as a percentage of the OI-Accounting-Interval. The normal share may not be guaranteed to the OI.

4. OI-Maximum-Share—Maximum share of processor time that may be used by OI as percentage of OI-Accounting-Interval. This is the processor share available to the OI, e.g., when it goes into repair mode—as indicated by the OS Independent to OIRM—and could be as high as 100% of the OI-Accounting-Interval depending on the implementation.

5. OI-Scheduling-Quantum—the maximum time for which OI may run un-preempted when the processor core executing the HOST OS/VMM is pre-empted for executing OI.

The current share of execution time (e.g., OI-Normal-Share or OI-Maximum-Share) may be tracked by OIRM using a parameter called OI-Current-Share. For example, at the beginning of each accounting interval, the OIEE receives a time credit equal to its OI-Current-Share of the execution time on the processor core. The credit is consumed on each schedule of the OIEE with an amount equal to the duration for which OIEE ran on the processor core. On exhaustion of the credits, the OIEE is blocked from execution until the next accounting interval where the credit is replenished.

The driver assisted scheduling scheme (item (1) above) may depend on an OI driver being installed in the HOST OS/VMM. The OI driver may register an interrupt vector with OIRM as part of its initialization with the OIRM. The OI driver may also cause generation of an OI worker thread that sits in an infinite loop waiting for an event notification from the OI driver. The OIRM may inject interrupts into the HOST OS/VMM to invoke an ISR (Interrupt Service Routine) handler corresponding to this vector in order to notify the OI driver of the start of the OI-Accounting-Interval.

Figure 3:
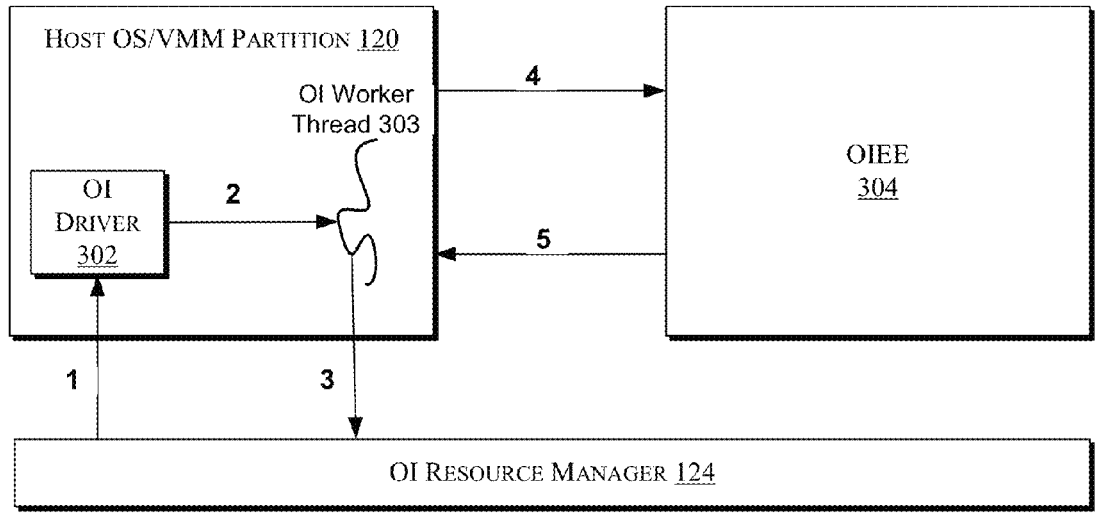
FIG. 3 illustrates a block diagram of various operations associated with execution of different memory partitions, according to an embodiment.

FIG. 3 illustrates a block diagram of various operations associated with execution of OIEE and Host OS/VMM, according to an embodiment. As shown in FIG. 3, at an operation 1, OIRM 124 injects an interrupt into the HOST OS/VMM 120. This may invoke the ISR registered by the OI driver 302 (e.g., stored in the OS/VMM partition 120). At an operation 2, the OI driver 302 (e.g., through a corresponding ISR) notifies the OI worker thread 303. In an embodiment, the thread 303 is not affined to any specific processor core. The operating system may schedule the thread 303 when appropriate. At an operation 3, thread 303 invokes an instruction to request OIRM 124 to schedule OIEE 304. At an operation 4, the OIRM 124 saves the current state of the HOST OS/VMM container 120 and loads the saved state of the OIEE 304. Operation 5 could be triggered due to arrival of an interrupt/IPI destined for HOST OS/VMM 120 or it could be triggered due to expiry of the current share (normal or maximum) of execution time configured for OIEE 304.

From the HOST OS/VMM and the OI worker thread 303 perspective, the IO instruction may be essentially a blocking instruction that returns back when the operation 5 above is executed. Depending on the reason for executing operation 5, the OIRM 124 may return one of below return values to the worker thread 303:

BLOCK—this returned value indicates that the operation 5 was executed because the time allocation to the OI was consumed. This may essentially cause the thread 303 to go back and block on wait for next event notification from the OI driver.

CONTINUE—this return value indicates that the operation 5 was executed, e.g., OI was pre-empted due to an external interrupt/IPI arriving for HOST OS/VMM. The time allocation for the OI in this accounting interval may not be consumed yet. The interrupt that caused the operation 5 to be executed could pre-empt the OI. When the HOST OS/VMM has completed the ISR processing (and possibly execution of other pending high priority tasks), it will reschedule the OI worker thread 303. Alternately, the HOST OS/VMM may move the thread 303 to another processor core while it processes the arriving interrupt. On being resumed, the worker thread 303 may check the return value and if the return value is CONTINUE, it executes operation 3 to resume OI execution.

Figure 4:
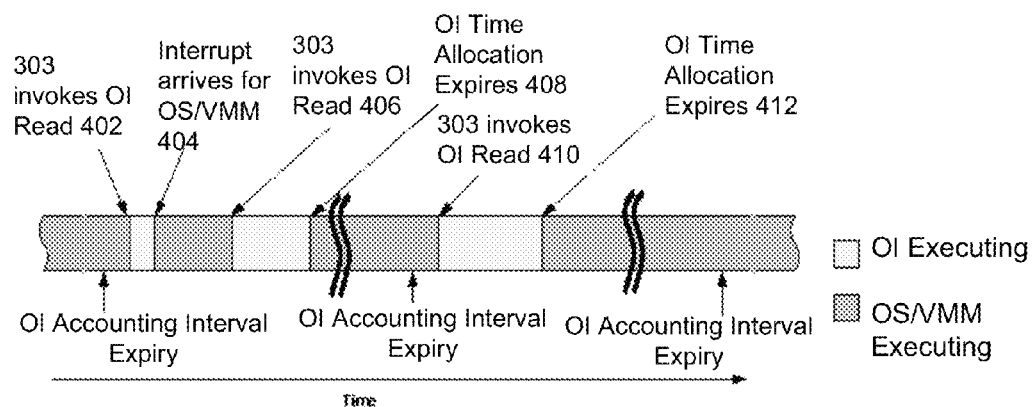
FIGS. 4-8 illustrate time charts according to some embodiments.

FIG. 4 illustrates a time chart according to an embodiment. Two accounting intervals are shown in FIG. 4. In the first accounting interval (starting from the left side of FIG. 4), OI is scheduled due to the OI driver thread 303 invoking the OI-READ at 402; however, OI is interrupted due to a HOST OS/VMM interrupt at 404. The OI is scheduled again later at 406 in the accounting interval and completes execution of its allocated time at 408. In the second accounting interval (starting at 410), OI runs uninterrupted until it completes execution for its allocated time at 412.

In some instances, there may be a possibility to carry out a complete denial of service, in-advertently or maliciously, on the OI by preventing or blocking the execution of the OI worker thread 303. The guard timer and the associated HOST OS/VMM preemption described in below allow OIRM to deliver to the minimum execution time guarantee made to OI.

More particularly, on injection of interrupt for requesting scheduling of the OI worker thread 303, the OIRM starts the guard timer. The duration of this timer may be set to 50% of the accounting interval in an embodiment. Other durations may also be set. If the OI gets enough opportunities to execute consuming its minimum configured time share, OIRM turns off the guard timer for that accounting interval. Any additional execution opportunities may thus not be guaranteed. On expiry of this guard timer, if the OI has not had an opportunity to execute its configured minimum time share, the OIRM goes into the pre-emptive scheduling mode until it has provide enough opportunities to OI to consume its configured minimum time share. When doing the preemptive scheduling to execute OI, the HOST OS/VMM interrupts may be blocked. However, the OIRM may control the maximum duration for which OI executes uninterrupted to be the OI-Scheduling-Quantum.

In one embodiment, the below operations describe the OIRM processing on guard timer expiry, where OIRM starts a timer of periodicity P, where P is determined by:

$$P=(OI\_Accounting\_Interval/2)/(OI\_Minimum\_Share/OI\_Scheduling\_Quantum)$$

On expiry of each interval, the following actions are performed: (a) Pre-empt HOST OS/VMM and schedule OI for execution on the processor core where HOST OS/VMM was pre-empted; (b) Configure a pre-emption time for OI to expire after OI-Scheduling-Quantum; and (c) On the OI pre-emption timer expiry, resume HOST OS/VMM.

Figure 5:
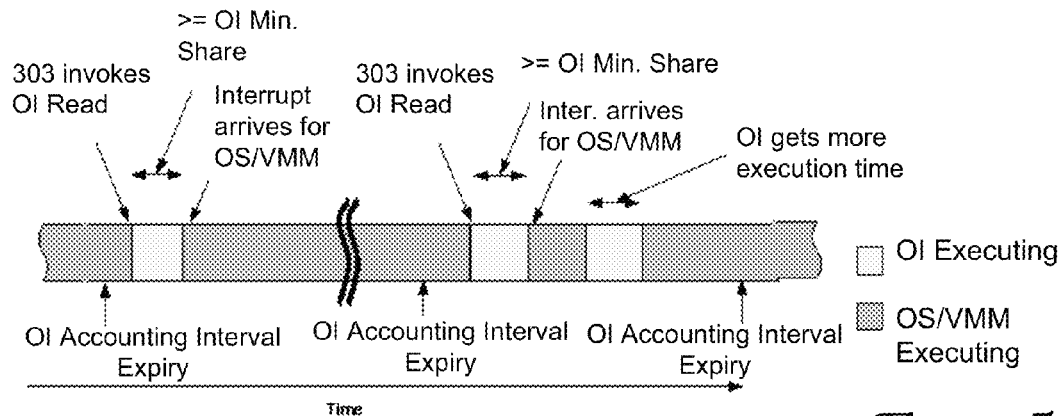

FIGS. 5-8 illustrate time charts in accordance with some embodiments. More particularly, FIG. 5 shows OI-Minimum-Share consumed prior to guard timer expiry. Here two accounting intervals are shown. In first accounting interval, the OI has already consumed its minimum share prior to the guard time expiry; however HOST OS/VMM never presents an opportunity to OI to execute more. In the second interval, similar condition happens however the HOST OS/VMM does allow OI to execute more than the OI-Minimum-Share.

Figure 6:
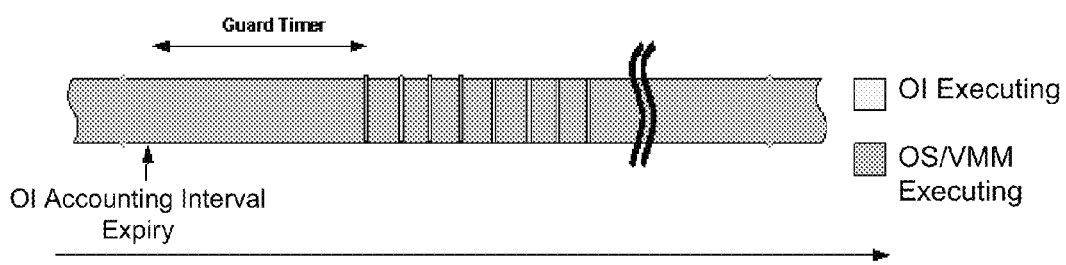
Figure 7:
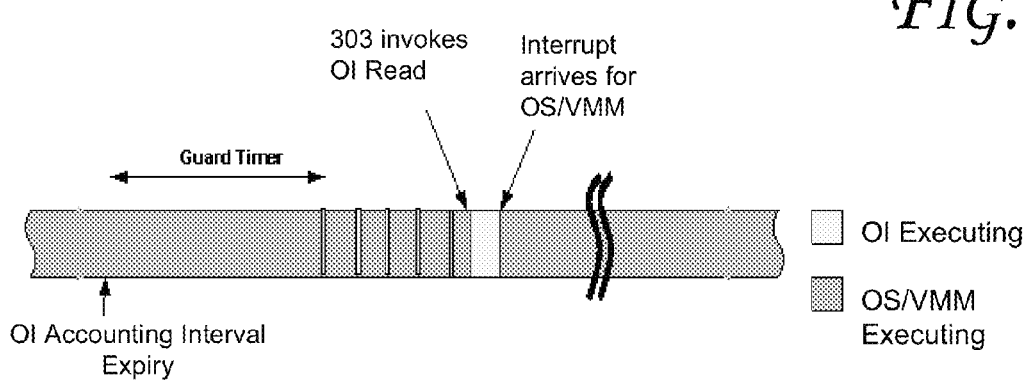
Figure 8:
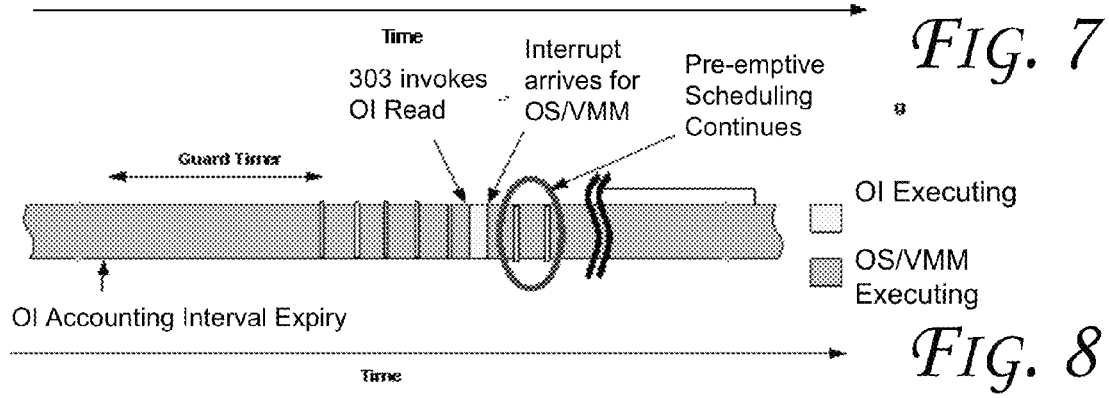

In FIG. 6, OI goes into preemptive scheduling mode and starts preempting HOST OS/VMM to execute OI-Scheduling-Quantum long bursts in OI until it has an opportunity to execute for its minimal configured time share. In FIG. 7, OI goes into preemptive scheduling mode and starts preempting HOST OS/VMM to execute OI-Scheduling-Quantum long bursts in OI. However, after few such quanta the driver in the OS becomes active and invokes the OI-READ to request scheduling of OI. Also, the OI-READ leads to OI executing long enough to consume the configured minimum time and the pre-emption of HOST OS/VMM to execute OI stop. In FIG. 8, OI goes into preemptive scheduling mode and starts preempting HOST OS/VMM to execute OI-Scheduling-Quantum long bursts in OI. However after few such quantum, the driver in the OS becomes active and invokes the OI-READ to request scheduling of OI (however, the OI does not run long enough to consume the configured minimum time). This causes OIRM to continue the pre-emptive scheduling until the configured minimum time is executed in OI.

In an embodiment, with respect to handling absence/failure of OI driver in host OS/VMM, the driver assisted scheduling mechanism may kick in if there is such a driver installed in the operating system. However, the OI scheduling may not be dependent on the driver being present; hence, the scheduling works in an OS friendly manner when the driver is installed and functioning. If the driver is not installed or is unloaded or the operating system itself is not installed or the operating system is not operational, the OIRM may perform the scheduling as though the guard time described above was zero. The pre-emptive mode of scheduling may be resorted to until the OIEE has received the configured minimum execution time. Arrival of HOST OS/VMM events in the OIEE time slice may in turn cause pre-emption of OIEE to run HOST OS/VMM once the OIEE has run for the configured minimum time.

In some embodiments, OS visibility may be provided into the cycles consumed in OI mode. This capability may also be useful for debugging tools to understand any anomalous behavior on the platform with OI enabled. The visibility into the cycles consumed in OI mode may be made available through a pair of per-core MSR (Model Specific Registers)—OI_CYCLE_LOW (contain lower order 32 bits of the cycle count) and OI_CYCLE_HIGH (contain higher order 32 bits of the counter)—that may be read by the operating system and/or performance monitoring tools. The OIRM may reset these counters to 0 for each core as part of its initialization sequence. On each OI execution, the time spent inside the OI (does not count time spent in SMM or HOST OS/VMM) may be updated through these counters.

Figure 9:
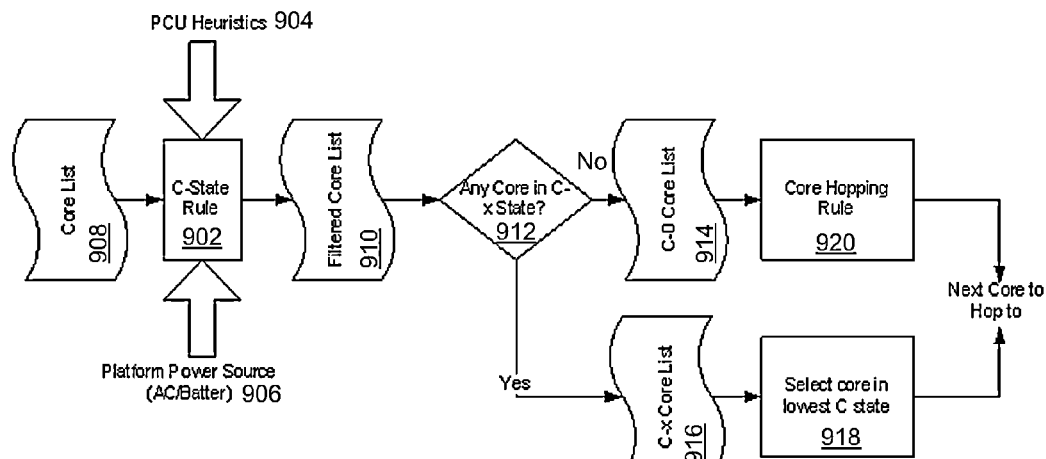
FIGS. 9 and 11 illustrate flow diagrams in accordance with some embodiments of the invention.

FIG. 9 illustrates a flow diagram to determine a next core to hop to, according to an embodiment. For example, when the driver assisted mode of scheduling is in place, the OIRM may request the HOST OS/VMM to select the processor core for execution of OIEE. When the interrupt to the OI driver is originated to request the OI scheduling, the operating system implicitly may make this selection when it schedules the OI worker thread 303 on a processor core. The processor core where the worker thread 303 is scheduled may be used for scheduling OIEE. In the mode where the HOST OS/VMM is non-responsive (e.g., the guard timer expires or the HOST OS/VMM does not have an OI driver installed), the OIRM may perform the processor core selection autonomously.

Generally, when a processor core (or a hardware thread) is actively executing processor instructions, it is said to be in C0 state. In this state all the system components (e.g., processor, buses, cache, memory etc.) are powered up and being used. However, when processor core is not executing instructions, it may be moved to C1, C2, C3 etc. states where progressively different parts of the system may be powered off or be put in a low power mode. These power saving states in general will are referred to as C-x states.

In accordance with some embodiments, OIRM may spread the load across all processor cores in the system. This may reduce or avoid penalizing software executing on a specific processor core; for example, a virtual machine pinned to a physical processor core by the VMM. The processor core hopping rule is performed by the current active instance of OIRM and depending on the outcome of the processor core hopping algorithm, it may hand off the active role to one of the standby instances. OI may run at any given time on one of the processor cores in a package. The OIRM may make a decision about the processor core to use to execute OI. The HOST OS/VMM may place one or more processor cores into C-x states. The logic used by OIRM to determine the processor core on which to execute may take the C-x state residency of a processor core and the current C-x state of the processor core into account.

In one embodiment, the OIRM may decide whether to take cycles from a C0 processor core or wake a C-x processor core to execute OI. The tradeoffs here are power vs. performance. Waking a C-x processor core to execute OI may not (in most cases) affect the performance of the HOST OS/VMM since no cycles are being taken from the processor cores where it is active. However, waking C-x processor cores does increase the power utilization. Another factor to consider is the dynamic throttling that may lower the performance of the C0 processor cores when a C-x processor core is woken due to change in the power/thermal envelope. The OIRM may consult the CPPM/PCU for heuristics to help with this determination. A second consideration is the "promise" made to the HOST OS/VMM about latency of wake from C-x state. Each C state is associated with a latency to wake to C0 state. When a processor core that has been placed in C-x state by the HOST OS/VMM is selected for executing OI, the state of that processor core moves to C0. Now if a waking event (e.g. an interrupt) occurs for HOST OS/VMM (when the processor core was executing OI), the OIRM may preempt OI to transfer control back to HOST OS/VMM. The latency incurred in performing the switch from OI to HOST OS/VMM may not exceed the promised wake latency from the C state that the HOST OS/VMM had requested. In some embodiments, the below rules are used by the OIRM to perform the processor core selection in such cases:

Referring to FIG. 9, at a C state rule (the C states referred here are the C states as requested and perceived by the HOST OS/VMM) may be applied 902. In order to avoid affecting the performance of the HOST OS/VMM by stealing cycles, the OIRM may run OIEE on a processor core that is idle (e.g., C-x state from a HOST OS/VMM perspective) and not being used by the HOST OS/VMM. Waking a C-x processor core to execute OIEE may however have adverse side effect of causing the power/thermal base autonomous throttling to be triggered and lead to HOST OS/VMM performance on the C0 processor cores to be adversely impacted. The OIRM (e.g., at 902) may make use of heuristics from the PCU 904 to determine the tradeoff involved with pre-empting a C0 processor core to execute OI vs. using a C-x processor core. Likewise, the power impact on the platform is higher if waking a sleeping processor core vs. using a processor core that is in C0 state. However the small increase in power consumption due to waking a processor core to execute OI may be acceptable if the platform is operating on AC power vs. when operating on battery power 906.

As shown in FIG. 9, application of C-State rule 902 may take the current core list 908, the PCU heuristics 904, and/or the platform power source 906 into account to generate a filtered core list 910 (which may include C0 processor cores as well as C-x processor cores). At operation 912 if it is determined that no core is in C-x state, the OIRM may perform a core hopping rule 920 (e.g., a round robin selection) among the C0 processor cores 914 to spread the load. If there are C-x processor cores, the OIRM may select a C-x processor core from the list 916 and not do any further hopping (e.g., select a core in lowest C state at 918). In an embodiment, the OIRM may periodically re-evaluate the condition by running the C-state rule 902 to make sure that the selected processor core is still the best processor core to execute upon.

Accordingly, processor core selection in accordance with the embodiment shown in FIG. 9 may include the following operations. First, use a list of processor cores 908 on which OI may execute and apply the C-state rule 902 to produce the filtered processor core list 910. Use the PCU heuristics 904 and platform power source 906 as inputs to the C-state rule. If there are any processor cores in C-x state 912 in filtered processor core list 910, then pick the processor core in lowest C-x state 918 as the next processor core to hop to. If there are no processor cores in C-x state, then invoke the processor core hopping rule 920 (e.g., to perform a round robin hop) among the list of C-0 processor cores 914. This may involve switching the active/standby roles of OIRM on these processor cores in some embodiments.

Figure 10:
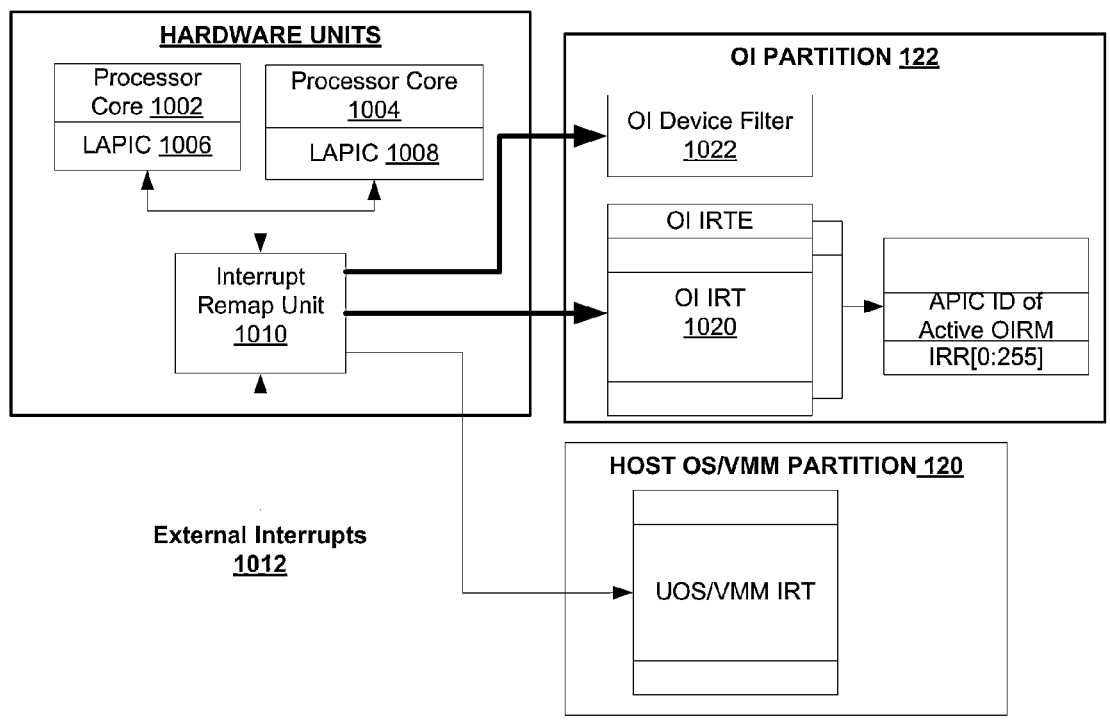
FIG. 10 illustrates a block diagram of various components used to handle interrupts originating from devices assigned to OI and injecting them into the OI partition, according to an embodiment.

FIG. 10 illustrates a block diagram of various components used to handle interrupts originating from devices assigned to OI and injecting them into the OI partition, according to an embodiment. As shown, hardware units may include a plurality of processor cores 1002 and 1004, each respectively having a LAPIC (Local Advanced Programmable Interrupt Controller) 1006 and 1008. The LAPICs are each in communication with an interrupt Remapping Unit 1010 (which receives external interrupts 1012).

Figure 11:
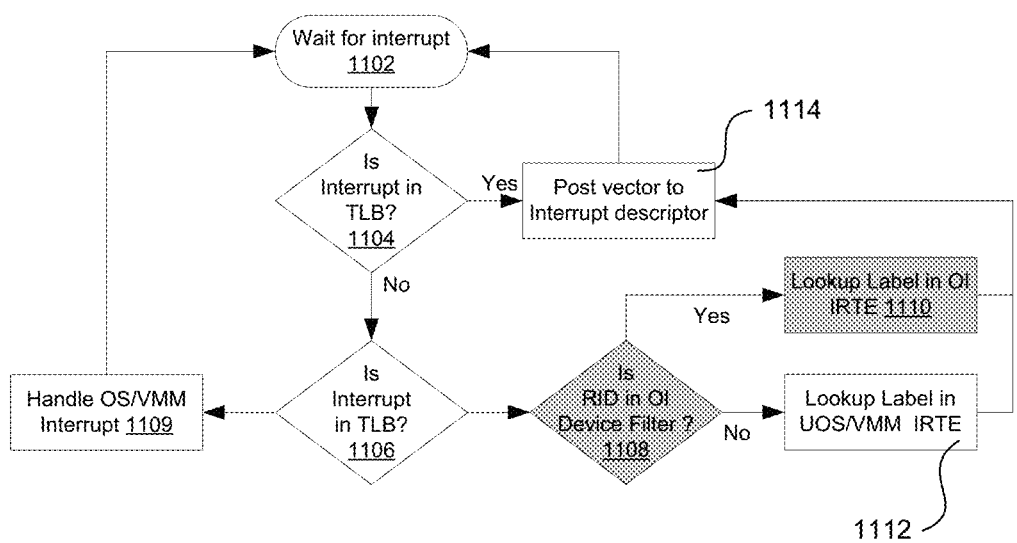

The Interrupt Remapping Unit 1010 may include support for: (a) registering a second Interrupt Remap Table (IRT) 1020 with OI IRT Entries (IRTE); (b) registering a OI device filter 1022 (e.g., having one bit for each PCI requester ID—8 KB); and/or (c) modifications to the interrupt remap logic as discussed below, e.g., shown in FIG. 11 with gray boxes, where FIG. 11 illustrates a flow diagram of operations associated with handling an OI-related interrupt, accordingly to an embodiment. For example, after receiving an interrupt 1102, if the posted interrupt is not in the interrupt TLB (Translation Lookaside Buffer) 1104, then it may be determined whether the interrupt is posted 1106 and if so a lookup 1108 may be performed in the device filter 1022 using the PCI requester ID. If not posted, then the interrupt is handled 1109. If the corresponding bit is set in the device filter 1022, then the OI IRT 1110 may be used for to look up the corresponding label, otherwise the OS/VMM IRT may be used for the look up 1112. After operations 1110 and 1112, the vector to interrupt descriptor may be posted at 1114.

Moreover, in an embodiment, the interrupt descriptor may have two items that help the Interrupt Remap Unit to determine where to post the interrupt: APIC ID to interrupt and vector to use as notification interrupt. Further, in some embodiments, one of the requirements for OI is that the interrupt delivery to the OI should not be affected by any action from the main OS. This implies that the posted interrupt method of delivering the vector in the interrupt descriptor to the local APIC programmed into the descriptor for delivery to the core is modified such that the interrupt remap unit notifies the OIRM CPU microcode using a new microcode event notification. More particularly, on receiving the microcode event notification from the interrupt remap unit, the OIRM may not immediately inject the posted interrupt into OI partition as the OI partition may not be executing at that time on any processor core. Hence the OIRM queues the received interrupts into a memory structure (e.g., OIPIC (OI Programmable Interrupt Controller)) described below and injects interrupts into the OI partition whenever its scheduled using the standard x86 interrupt delivery mechanism using the OI IDT (Interrupt Descriptor Table).

Figure 12:
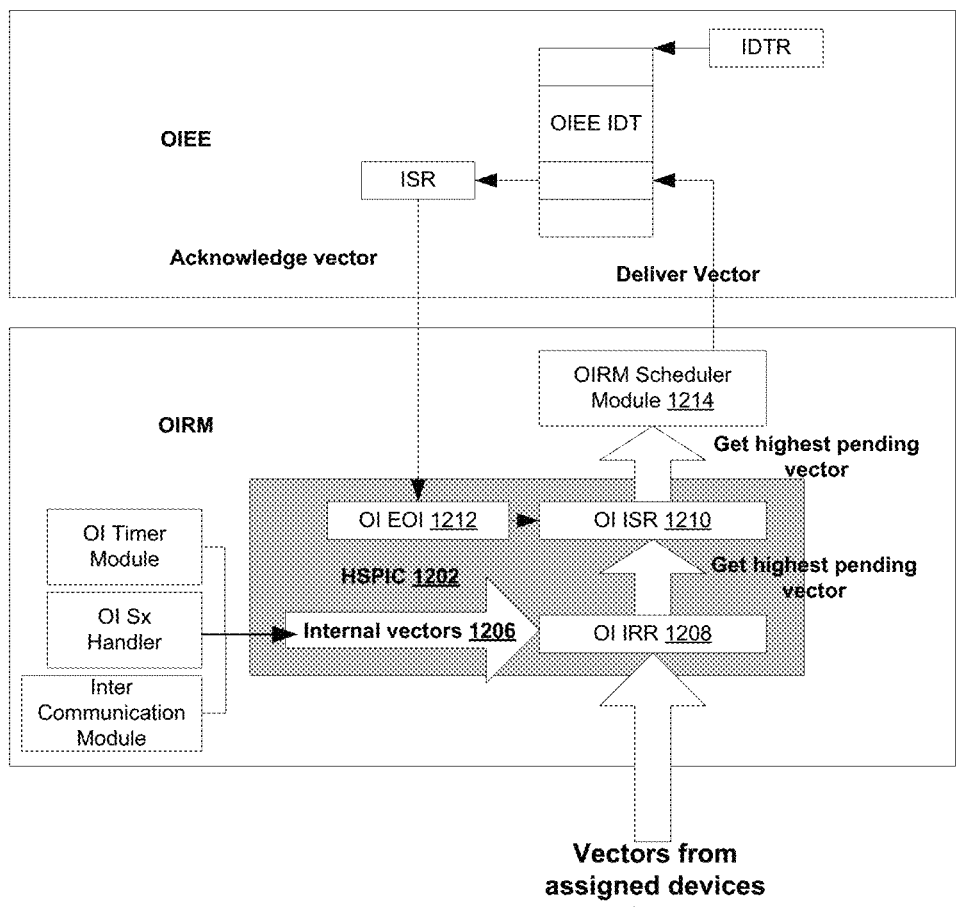
FIG. 12 illustrates various components in communication with an OIPIC module, in accordance with an embodiment.

FIG. 12 illustrates various components in communication with the OIPIC module, in accordance with an embodiment. As shown, OIPIC module 1202 receives vectors for delivery into the OIEE from two possible sources: (1) Interrupts from devices assigned to OIEE 1204 (e.g., notified by the Interrupt Remapping Unit and posted into the OI interrupt buffer); or (2) OIRM injected interrupts for OIEE timer, inter-OI communication notifications, power management events, etc. (marked collectively as 1206).

The OIPIC module 1202 may model three registers to queue vectors for delivery to the OIEE: (1) OI IRR (Interrupt Request Register) 1208 (e.g., where all vectors arriving from internal or external sources enter this 256 bit register); (2) OI ISR (OI In-Service Register) 1208 (e.g., the highest priority vector from OI IRR is moved into the OI ISR if it has higher priority than the vector already in the OI ISR—this may be a 256 bit register that tracks the interrupt vectors being currently serviced by OIEE—the current interrupt vector(s) already in the OI ISR remain, e.g., indicating that a higher priority interrupt has interrupted a lower priority interrupt); and/or (3) OI EOI (End Of Interrupt) 1212 (e.g., where the OIEE ISR signals completion of the handling for the highest priority vector currently marked in the OI ISR).

In some embodiments, the following actions are performed by the OIPIC module 1202 when OI partition is scheduled (e.g., by the scheduler 1214) for execution on a processor core: (1) if no vectors are pending in OI IRR, then no action needed; (2) get highest priority vector from OI IRR and compare to highest vector in OI ISR (if the OI IRR vector is lower than OI ISR vector, then no action needed); (3) if OIEE is interruptible, then set the bit corresponding to the highest vector received from OI IRR in the OI ISR (and clear that vector from OI IRR in an embodiment); and/or (4) return the highest vector pending in OI ISR as the vector to be injected into OIEE. In response to the interrupt, the interrupt controller driver in OIEE signals completion using a write to the OIEOI register 1212. On receiving the OIEOI from OIEE, the OIPIC 1202 clears the bit corresponding to the highest priority vector pending in OI ISR 1210. It then determines if there is any other vector that can be injected into OIEE on next resume.

As discussed with reference to FIGS. 10-12, non-intrusive techniques on the Host OS/VMM are provided that do not place restrictions on the interrupt vectors that may be used by the Host OS/VMM. Likewise such embodiments do not intercept any accesses to the LAPIC/IOAPIC from the Host OS/VMM nor do they try to virtualize any of those devices. This allows for a mechanism of directing the interrupts into different partitions, making this capability significantly better and more scalable when compared to other implementations without this capability.

In some embodiments, in order to provide the memory separation between the Host OS/VMM and OI partitions, the OIRM may make uses of one or more bits of a hardware range-register to determine whether to block the Host OS/VMM generated accesses to the OI memory partition. Likewise in order to control accesses from OI partition to the Host OS/VMM memory partition, the OIRM may create a page table—such as an Extended Page Table (EPT)—under the OI partition. For example, the OI partition described above may be used to carry out some security sensitive work like pre-boot authentication, media trans-coding, e-commerce, etc. When such operations are being performed, the OI partition may have secrets like keys and passwords. In turn, software based attacks on OI memory to steal these secrets using Host OS/VMM processor based accesses or using DMA bus-master devices are blocked using range registers and DMA device filters.

In some embodiments, two types of protection may be provided: (1) protection to data at rest; or (2) protection to data when in use. Protecting data at rest when it is in volatile or non-volatile memory requires that the data be encrypted such that it is of no value to an attacker. For this, OI needs a way to decrypt the data when it needs to operate on it and at the same time secure the data such that it may not be stolen when it is operating on it.

Protecting the data at rest implies that the data may be encrypted using an encryption algorithm like Advanced Encryption Standard (AES) (256 bit or other versions; using cipher in any mode, such as CBC (Cipher Block Chaining), CTR (Counter mode), etc.), etc. The key used to do the encryption also needs to be secured. In an embodiment, each application that needs to protect its secrets has its own key for encryption of its secrets. The OIRM may provide a blob service to secure this key using a processor fuse in the core or uncore. For the blob key operation, the user generates a key that it wants to use to secure its data and requests the OIRM to blob it. Moreover, as will be discussed further below, some embodiments may also aid in securing the user generated key in the process.

In accordance with an embodiment, the following pseudo code may be used by the user to generate the key blob:

```
1.    application_key_generation_function( )
2.    {
3.        char *key_buffer = malloc(4096);
4.        generate_key(key_buffer);
5.        blob_key(key_buffer);
6.    }
```

In line 4 of above pseudo code, the application generates a key in the key_buffer and in line 5 the application invokes the blob service (e.g., provided by the OIRM) to create a key blob. The OIRM blob service may encrypt the key in the key buffer using the processor key 113 used for this blob service. Thus, the application has a secure key that is bound to the platform that it may use to protect its secrets. The application does not need to retain the original key it generated in line 4 above. The key blob is all it needs henceforth for operating on the data.

In some embodiments, in order to protect the data at run time, the data may never be in the clear in the system memory. This may be achieved by use of one page of on-package memory 111 to temporarily store OI secrets. In an embodiment, the on-package memory 111 allows the content of this memory to not be accessible using the bus analyzer and "freeze can" attacks. In other words, unencrypted information stored in the memory 111 may be unavailable outside of the processor 102-1 In an embodiment, the OIRM provides the user with the following instructions for enabling the secure memory access: (1) Load_Key_Page—moves data from a memory buffer to the secure memory and decrypts it for use by the application; (2) Store Key Page—moves the data from the secure memory to a memory buffer and clears the secure memory.

In an embodiment, the load key page operation takes two inputs: (a) the blobbed key used for encryption of the key page; and (b) the physical address of the buffer holding the encrypted data (referred to as the key page). When the Load_Key_Page operation is invoked, OIRM performs the following actions: (1) Copy the content of the page pointed to by the physical address into the on-package memory 111; (2) Decrypt the key blob using the processor fuse key; (3) Decrypts the data in the on-package memory 111 using the decrypted key; (4) Update the EPT of OI to redirect access to the physical address passed to this operation to the on-package memory 111; and/or (5) The application may now use standard software constructs to access the secrets.

FIGS. 13 and 14 illustrate block diagrams of operations associated with utilizing a load key, according to some embodiments. In FIG. 13, load key transfers physical memory (e.g., encrypted) to secure memory and decrypts data by using an applicant's key. In FIG. 14, OI EPT may be remapped to redirect the physical memory to the secure memory.

In some embodiments, only a single key page may be loaded at any point of time. Attempting to do a Load_Key_Page without doing a Store_Key_Page on the previously loaded page may generate a failure. The key page management from the OIEE kernel may rely on an OI kernel module that provides the load/store service to applications. The kernel module may hook into the OI kernel scheduler to be notified of process/task switches and uses the Load/Store Key Page to change the key-page based on the application running in OI.

In an embodiment, the store key page operation takes two inputs: (a) the blobbed key used for encryption of the key page; and (b) the physical address of the buffer to store the encrypted data (referred to as the key page). OIRM performs the following actions: (1) Decrypt the key blob using the processor fuse key; (2) Encrypt the content of the on-package memory 111 using the decrypted blob key; and/or (3) Copy the content of the on-package memory 111 to the memory page passed by the application.

FIGS. 15 and 16 illustrate block diagrams of operations associated with utilizing a store key, according to some embodiments. In FIG. 15, store key transfers secure memory (e.g., clear) to physical memory and encrypts data by using an applicant's key. In FIG. 16, OI EPT may be remapped to undo redirection of the physical memory.

In an embodiment, the following pseudo code may be used to for Load_Key_Page and Store-Key_Page discussed above:

```
Do_secret_work_example_function(uint64_t  key_blob_PA,
uint64_t secret_page_PA)
{
    Char *secret_page_la = map_secret_page(secret_page_PA);
    Load_Key_Page(key_blob_PA, secret_page_PA);
    Do_secret_work(secret_page_la);
    Store_Key_Page(key_blob_PA, secret_page_PA);
}
```

In the above code, "la" stands for linear and "PA" stands for Physical Address. Accordingly, an embodiment provides tamper resistant memory for handling security sensitive data in OI, e.g., by protecting secrets in OI memory from hardware based attacks like cold boot or software based attacks. This makes the capability significantly better and/or scalable as compared to the implementation without this capability.

In some embodiments, in order to provide memory separation between the Host OS/VMM and OIEE, the OIRM makes uses of a hardware range-register that blocks the Host OS/VMM generated accesses to the OI memory. Likewise in order to control accesses from OI partition to the Host OS/VMM memory, the OIRM creates a page table—such as an Extended Page Table (EPT)—under the OI partition.

When the system is suspended (S3), the system memory is in self refresh state. However, the CPU is powered off and hence there are no protections active on the memory. Hence an adversary may be able to modify the contents of memory when system is in S3 state and if the memory is not verified on resume (S0), this may lead to code injection attacks on OI. One technique to avoid such code injection attacks is to hash the memory prior to entering S3 and verify the contents on resuming from S3 into S0. This approach may however have two drawbacks in some instances: (1) it extends the amount of time needed to transition from S0 to S3 due to the additional work to be done to hash the memory content; and (2) it increases the amount of time needed to transition from S3 to S0 due to the additional work to be done to hash the memory to verify the contents are not tampered.

As previously indicated, transitioning a system into S3 causes the CPU to be powered off and the memory to be placed into a self refresh mode. At this time, there are no protections on the memory active as the range registers and device filters are not operational. The memory image retained on S3 is executed when the system returns to S0 state. However, the integrity of this memory is now suspect and there might be malicious code injected into the self refresh image or the memory been corrupted or tampered in some form inadvertently. To this end, an embodiment verifies the integrity of the memory on resume from S3. The OIRM 124 may for example measure the integrity of the memory image in self refresh before allowing it to execute. As previously stated, one approach for this integrity verification would be to record the measurement of the OI memory on S0-S3 transition and verify the image on transition from S3 to S0. This approach may increase the latency of resume from S3 since the OIRM will need to spend a large amount of time performing the integrity verification before continuing with the S3 resume. An inadvertent side effect of this scheme (that becomes more pronounced on systems with 2LM (two level memory)) is the overhead of fetching the memory page from the NV (Non-Volatile) memory to the DRAM page cache for measurement. The S3 resume path has to be optimized to minimize the delays for uses like "instant-ON" mode, where resume from S3 might be done for a short period of time to perform synchronization activities before placing the system back in S3.

Figure 17:
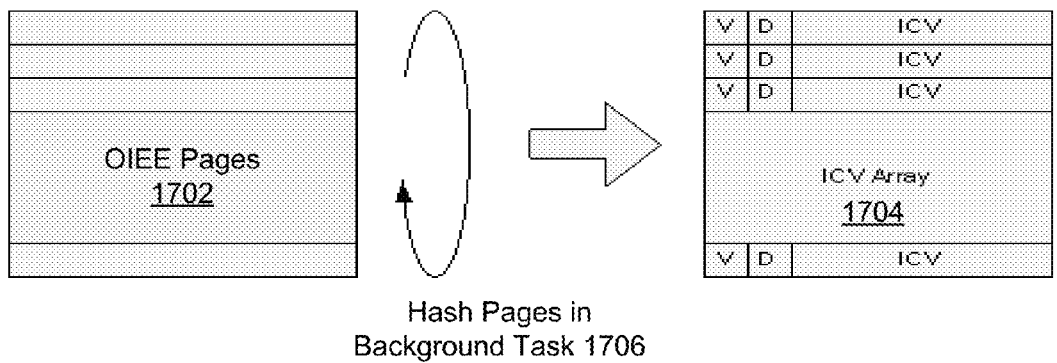
FIG. 17 illustrates a block diagram of operations associated with secured transition between S0 and S3, according to an embodiment.

In an embodiment, in order to minimize the resume time, the integrity check value (ICV) may be computed for the OIEE image on a page by page basis so that on resume from S3, the time to validate the ICV may be minimized since now the verification may be done on a page by page basis as the OIEE code and data is accessed after a S3 resume. Referring to FIG. 17, a block diagram of operations associated with secured transition between S0 and S3 are shown, according to an embodiment. The page by page integrity check values of OIEE pages 1702 may be recorded in an ICV array 1704 (e.g., by the OIRM 124). Each element of the ICV array corresponds to one page in the OI memory and has below information: (1) Integrity Check Value (ICV)—a one-way cryptographic hash of the page generated using one-way cryptographic hash algorithms like SHASHA256, SHA512, etc. as configured; (2) ICV Valid (illustrated in FIG. 17 as "V")—True/False; and/or (3) DMA (Direct Memory Access) page (illustrated in FIG. 17 as "D")—true/false. OIRM may also maintain a SHA hash (e.g., also in memory 114) regarding the ICV array to validate the integrity of the ICV array. When performing a transition from S0 to S3 state, the OIRM may sign the hash of the ICV array so that it may be validated on resume from S3.

In some embodiments, the OIRM may use a background task 1706 to (e.g., periodically) hash the OI pages 1702. Prior to each transition to the OI, the background task 1706 may be invoked to hash a fixed set of pages in memory. For example, if the OI image is 64 MB in size, there are 16384 pages to integrity protect. The background task may run through the 16K pages in a round robin manner and perform the hash of 16 pages in each run. Thus, the background task will need to be invoked 1K times to perform the hash of all 16K pages allocated to OIEE. In an embodiment, the time taken to hash the pages is attributed to OI and is subtracted from execution credit.

Once the hash of a page has been noted, the OIRM may track writes to those pages in order to detect modifications needing a re-hash. The OIRM may perform the write tracking using the OI EPT. Once a page has been hashed and the hash noted in the ICV array 1704, it is marked as read-only in the EPT and the ICV is marked as valid in the ICV array. A write to the page from OIEE may cause an EPT fault leading to OIRM marking the page ICV as invalid and making the page as writable again. The page may now be rehashed when the back ground hashing task gets around to this page again and after the hash has been noted it will be remarked as read-only. Furthermore, writes to pages using DMA operations may not be tracked using the EPT faults. For tracking writes to the DMA pages, OIRM may rely on the OIEE kernel to notify the OIRM prior to submitting a page for DMA to a device. OIRM notes these pages as DMA pages in the ICV array and may not perform any ICV checks on these pages as part of its background task.

For S0 to S3 transitions, the OIRM may scan through the ICV page array if the transition is an S3 transition and notes ICV values for pages that have invalid ICV recorded and for DMA pages. For pages marked as DMA pages, in addition to recording their hash, the OIRM may also clear their status as DMA pages. The OIRM then performs a hash over the ICV array itself. The hash of the ICV array may be signed using the OIRM ICV signing key derived from processor key 113 in the package. The signed hash of the ICV array may be left in the system memory as its tamper can be detected by OIRM.

For an S3 resume, the BIOS (Basic IO System) may notify the OIRM to resume the OI image. The OIRM may create a container for OI and then determines if there is a valid ICV array in OI memory. In an embodiment, the validity of the ICV array is determined by verifying the signature on the hash of the ICV array and checking the hash of the ICV array against the value stored on S0 to S3 transition. If ICV array integrity is not intact, OIRM may continue the OI initialization as a normal reset path (e.g., the image in memory is discarded and a fresh load code load is performed). If the integrity of the ICV array is not compromised, OIRM may mark all OIEE pages as not present in the OI EPT and transfer control to the OIEE. As OIEE starts executing, the code and data page accesses generate EPT faults directed to OIRM. If there is a valid ICV for the page in the ICV array, the OIRM computes the ICV on the faulting page and matches it against the ICV in the ICV array to verify the integrity of the page. This page may then be mapped into the OI EPT as a read-only page (e.g., to track changes to the page). Accordingly, the incremental hashing using IORM and processor generated EPT is a key difference compared to what is being done today in for example hypervisors. Moreover, an embodiment adds a very crucial mechanism of efficiently verifying integrity of OI memory when coming out of self refresh. This makes the capability significantly better and/or scalable as compared to the implementation without this capability.

Figure 18:
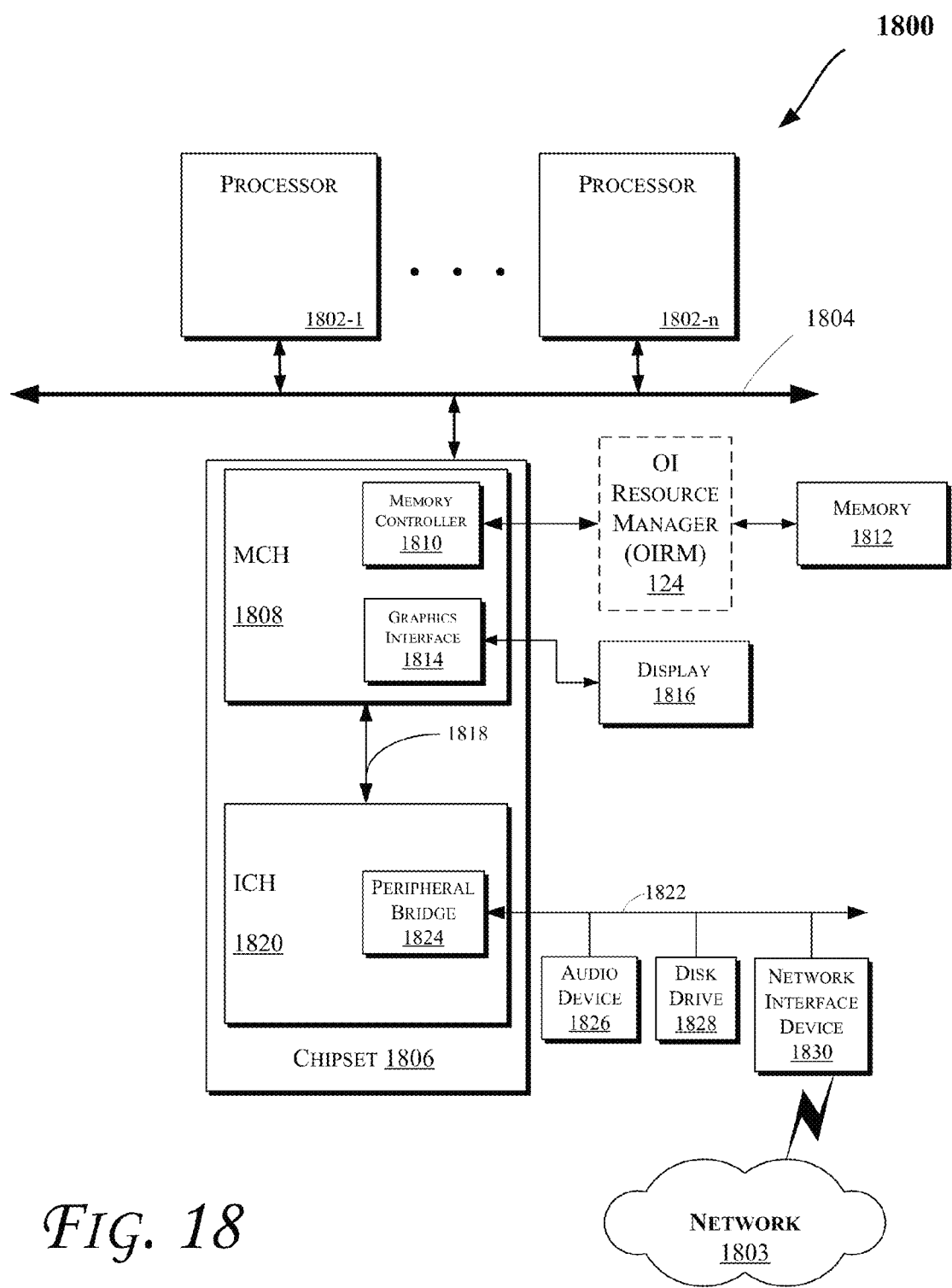

FIG. 18 illustrates a block diagram of a computing system 1800 in accordance with an embodiment of the invention. The computing system 1800 may include one or more central processing unit(s) (CPUs) 1802 or processors that communicate via an interconnection network (or bus) 1804. The processors 1802 may include a general purpose processor, a network processor (that processes data communicated over a computer network 1803), or other types of a processor (including a reduced instruction set computer (RISC) processor or a complex instruction set computer (CISC)). Moreover, the processors 1802 may have a single or multiple core design. The processors 1802 with a multiple core design may integrate different types of processor cores on the same integrated circuit (IC) die. Also, the processors 1802 with a multiple core design may be implemented as symmetrical or asymmetrical multiprocessors. In an embodiment, one or more of the processors 1802 may be the same or similar to the processors 102 of FIG. 1. For example, one or more of the processors 1802 may include one or more of the caches, storage devices, and/or logics discussed with reference to FIGS. 1-17, including for example OIRM 124. Also, the operations discussed with reference to FIGS. 1-17 may be performed by one or more components of the system 1800.

A chipset 1806 may also communicate with the interconnection network 1804. The chipset 1806 may include a memory control hub (MCH) 1808. The MCH 1808 may include a memory controller 1810 that communicates with a memory 1812 (which may be the same or similar to the memory 114 of FIG. 1). The memory 1812 may store data, including sequences of instructions, that may be executed by the CPU 1802, or any other device included in the computing system 1800. In one embodiment of the invention, the memory 1812 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 1804, such as multiple CPUs and/or multiple system memories.

The MCH 1808 may also include a graphics interface 1814 that communicates with a display device 1816. In one embodiment of the invention, the graphics interface 1814 may communicate with the display device 1816 via an accelerated graphics port (AGP). In an embodiment of the invention, the display 1816 (such as a flat panel display) may communicate with the graphics interface 1814 through, for example, a signal converter that translates a digital representation of an image stored in a storage device such as video memory or system memory into display signals that are interpreted and displayed by the display 1816. The display signals produced by the display device may pass through various control devices before being interpreted by and subsequently displayed on the display 1816.

A hub interface 1818 may allow the MCH 1808 and an input/output control hub (ICH) 1820 to communicate. The ICH 1820 may provide an interface to I/O device(s) that communicate with the computing system 1800. The ICH 1820 may communicate with a bus 1822 through a peripheral bridge (or controller) 1824, such as a peripheral component interconnect (PCI) bridge, a universal serial bus (USB) controller, or other types of peripheral bridges or controllers. The bridge 1824 may provide a data path between the CPU 1802 and peripheral devices. Other types of topologies may be utilized. Also, multiple buses may communicate with the ICH 1820, e.g., through multiple bridges or controllers. Moreover, other peripherals in communication with the ICH 1820 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 1822 may communicate with an audio device 1826, one or more disk drive(s) 1828, and a network interface device 1830 (which is in communication with the computer network 1803). Other devices may communicate via the bus 1822. Also, various components (such as the network interface device 1830) may communicate with the MCH 1808 in some embodiments of the invention. In addition, the processor 1802 and other components shown in FIG. 18 (including but not limited to the MCH 1808, one or more components of the MCH 1808, etc.) may be combined to form a single chip. Furthermore, a graphics accelerator may be included within the MCH 1808 in other embodiments of the invention.

Furthermore, the computing system 1800 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 1828), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 19:
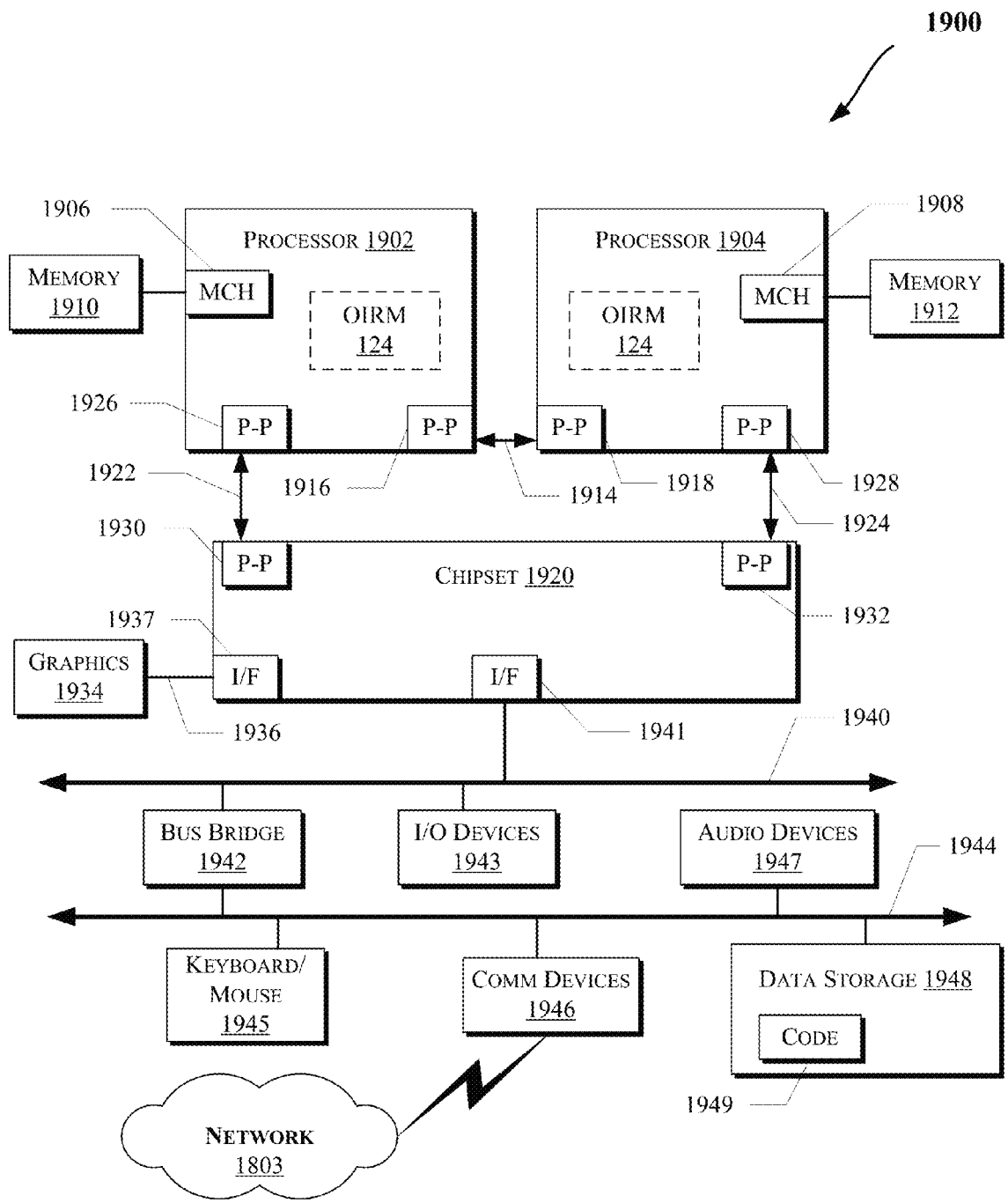

FIG. 19 illustrates a computing system 1900 that is arranged in a point-to-point (PtP) configuration, according to an embodiment of the invention. In particular, FIG. 19 shows a system where processors, memory, and input/output devices are interconnected by a number of point-to-point interfaces. The operations discussed with reference to FIGS. 1-18 may be performed by one or more components of the system 1900.

As illustrated in FIG. 19, the system 1900 may include several processors, of which only two, processors 1902 and 1904 are shown for clarity. The processors 1902 and 1904 may each include a local memory controller hub (MCH) 1906 and 1908 to enable communication with memories 1910 and 1912. The memories 1910 and/or 1912 may store various data such as those discussed with reference to the memory 1812 of FIG. 18.

In an embodiment, the processors 1902 and 1904 may be one of the processors 1802 discussed with reference to FIG. 18, e.g., including one or more of the caches discussed with reference to FIGS. 1-18. The processors 1902 and 1904 may exchange data via a point-to-point (PtP) interface 1914 using PtP interface circuits 1916 and 1918, respectively. Also, the processors 1902 and 1904 may each exchange data with a chipset 1920 via individual PtP interfaces 1922 and 1924 using point-to-point interface circuits 1926, 1928, 1930, and 1932. The chipset 1920 may further exchange data with a graphics circuit 1934 via a graphics interface 1936, e.g., using a PtP interface circuit 1937.

At least one embodiment of the invention may be provided within the processors 1902 and 1904. For example, one or more of the cores 106 of FIG. 1 may be located within the processors 1902 and 1904. Also, processors 1902 and 1904 may include one or more of the caches, storage devices, and/or logics discussed with reference to FIGS. 1-18. For example, OIRM 124 may be provided in the processors 1902/1904; however, OIRM may be provided in other locations such as discussed with FIGS. 1-18 (e.g., between MCH 1906/1908 and processors 1902/1904, in the chipset 1920, etc.) Other embodiments of the invention, however, may exist in other circuits, logic units, or devices within the system 1900 of FIG. 19. Furthermore, other embodiments of the invention may be distributed throughout several circuits, logic units, or devices illustrated in FIG. 19.

The chipset 1920 may communicate with a bus 1940 using a PtP interface circuit 1941. The bus 1940 may communicate with one or more devices, such as a bus bridge 1942 and I/O devices 1943. Via a bus 1944, the bus bridge 1942 may communicate with other devices such as a keyboard/mouse 1945, communication devices 1946 (such as modems, network interface devices, or other communication devices that may communicate with the computer network 1803), audio I/O device 1947, and/or a data storage device 1948. The data storage device 1948 may store code 1949 that may be executed by the processors 1902 and/or 1904.

In various embodiments of the invention, the operations discussed herein, e.g., with reference to FIGS. 1-19, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed herein. Additionally, such tangible computer-readable media may be downloaded as a computer program product, wherein the program may be transferred from a remote computer (e.g., a server) to a requesting computer (e.g., a client) by way of data signals in a propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
   one or more processor cores;
   a cache storage configured to be accessed by said one or more processor cores using an extended page table (EPT);
   an on-package memory to store a key page mapped to physical addresses from an Operating System (OS) independent memory partition, having an execution environment that is independent of, and unaffected by operating systems and virtual machine managers; and
   an embedded processor key configured to be accessed by an OS Independent (OI) Resource Manager (OIRM) to perform cryptographic operations, wherein an application running on the processor from outside the OI memory partition can invoke a blob service provided by the OIRM to create a key blob to access the key page inside the OI memory partition.

2. The processor of claim 1, wherein the OIRM is to dynamically partition cycles of the processor between executing operations or instructions from inside the OI memory partition and from outside the OI memory partition.

3. The processor of claim 2, wherein the OIRM is to couple a plurality of partitions to the processor, the plurality of partitions including at least the OI memory partition and a second partition to store an OS.

4. The processor of claim 3, wherein responsive to an instruction for loading the key page from said application running on the processor from outside the OI memory partition, the OIRM is to copy data from the key page into the on-package memory and decrypt the data in the on-package memory using said key blob.

5. The processor of claim 4, wherein further responsive to the instruction for loading the key page from said application running on the processor from outside the OI memory partition, the OIRM is to update the EPT to redirect accesses, from the physical addresses mapped to the key page in the OI memory partition, to physical addresses mapped to the on-package memory.

6. The processor of claim 5, wherein further responsive to the instruction for loading the key page from said application running on the processor from outside the OI memory partition, the OIRM is to decrypt said key blob using the embedded processor key and decrypt the data in the on-package memory using the decrypted key blob.

7. The processor of claim 6, wherein responsive to an instruction for storing the key page from said application running on the processor from outside the OI memory partition, the OIRM is to encrypt the data in the on-package memory using said key blob and copy the encrypted data from the on-package memory to the key page in the OI memory partition.

8. The processor of claim 7, wherein further responsive to the instruction for storing the key page from said application running on the processor from outside the OI memory partition, the OIRM is to decrypt said key blob using the embedded processor key and encrypt the data in the on-package memory using the decrypted key blob.

9. The processor of claim 8, wherein the OIRM is to maintain an integrity check value array to store data corresponding to one or more pages of the OI memory partition, wherein each entry in the array is to indicate a secure hash algorithm value, a validity, and direct memory access of a corresponding page in the OI memory partition.

10. The processor of claim 9, wherein the OIRM is to determine integrity of the one or more pages of the first partition based on values stored in a corresponding entry of the integrity check value array.

11. The processor of claim 10, wherein the OIRM is to cause an update to a value stored in the integrity check value array in response to detection of a modification to a corresponding page of the OI memory partition.

12. A computer-implemented method comprising:
   accessing a cache storage by one or more processor cores using an extended page table (EPT);
   storing, in an on-package memory, a key page mapped by the EPT to physical addresses from an Operating System (OS) independent memory partition, having an execution environment that is independent of, and unaffected by operating systems and virtual machine managers;
   accessing an embedded processor key by an OS Independent (OI) Resource Manager (OIRM) to perform a cryptographic operation;
   storing said key page inside the OI memory partition; and
   invoking a blob service provided by the OIRM for an application running on the one or more processor cores from outside the OI memory partition to create a key blob to access said key page mapped to physical addresses inside the OI memory partition.

13. The method of claim 12, wherein the OIRM is to dynamically partition processor cycles between executing operations or instructions from inside the OI memory partition and from outside the OI memory partition.

14. The method of claim 12, wherein the OIRM is to couple a plurality of partitions to the one or more processor cores, the plurality of partitions including at least the OI memory partition and a second partition to store an OS.

15. The method of claim 12, wherein the OIRM is to copy data from the key page into the on-package memory and decrypt the data in the on-package memory using said key blob responsive to an instruction for loading the key page from said application running on the one or more processor cores from outside the OI memory partition.

16. The method of claim 15, wherein the OIRM is to update the EPT to redirect accesses, from the physical addresses mapped to the key page in the OI memory partition, to physical addresses mapped to the on-package memory further responsive to the instruction for loading the key page from said application running on the processor from outside the OI memory partition.

17. The method of claim 12, wherein the OIRM is to encrypt the data in the on-package memory using said key blob and copy the encrypted data from the on-package memory to the key page in the OI memory partition responsive to an instruction for storing the key page from said application running on the one or more processor cores from outside the OI memory partition.

18. The method of claim 12, wherein the OIRM is to maintain an integrity check value array to store data corresponding to one or more pages of the OI memory partition, wherein each entry in the array is to indicate a secure hash algorithm value, a validity, and direct memory access of a corresponding page in the OI memory partition.

19. The method of claim 18, wherein the OIRM is to determine integrity of the one or more pages of the first partition based on values stored in a corresponding entry of the integrity check value array.

20. The method of claim 18, wherein the OIRM is to cause an update to a value stored in the integrity check value array in response to detection of a modification to a corresponding page of the OI memory partition.

21. A computing system comprising:
a processor comprising:
one or more processor cores,
a cache storage configured to be accessed by said one or more processor cores using an extended page table (EPT),
an on-package memory to store a key page mapped to physical addresses from an Operating System (OS) independent memory partition, having an execution environment that is independent of, and unaffected by operating systems and virtual machine managers,
an embedded processor key configured to be accessed by an OS Independent (OI) Resource Manager (OIRM) to perform cryptographic operations, wherein an application running on the processor from outside the OI memory partition can invoke a blob service provided by the OIRM to create a key blob to access the key page inside the OI memory partition; and
a memory comprising a plurality of partitions, the plurality of partitions including at least the OI memory partition and a second partition to store an OS.

22. The system of claim 21, wherein the OIRM is to dynamically partition cycles of the processor between executing operations or instructions from inside the OI memory partition and from outside the OI memory partition.

23. The system of claim 22, wherein the OIRM is to allocate a predetermined minimum guaranteed execution duration for one or more instructions stored in the OI memory partition based on a determination that OIRM has failed to schedule the one or more instructions for execution within a select time period.

24. The system of claim 21, wherein responsive to an instruction for loading the key page from said application running on the processor from outside the OI memory partition, the OIRM is to copy data from the key page into the on-package memory and decrypt the data in the on-package memory using said key blob.

25. The system of claim 24, wherein further responsive to the instruction for loading the key page from said application running on the processor from outside the OI memory partition, the OIRM is to update the EPT to redirect accesses, from the physical addresses mapped to the key page in the OI memory partition, to physical addresses mapped to the on-package memory.

26. The system of claim 25, wherein further responsive to the instruction for loading the key page from said application running on the processor from outside the OI memory partition, the OIRM is to decrypt said key blob using the embedded processor key and decrypt the data in the on-package memory using the decrypted key blob.

27. The system of claim 26, wherein responsive to an instruction for storing the key page from said application running on the processor from outside the OI memory partition, the OIRM is to encrypt the data in the on-package memory using said key blob and copy the encrypted data from the on-package memory to the key page in the OI memory partition.

28. The system of claim 27, wherein further responsive to the instruction for storing the key page from said application running on the processor from outside the OI memory partition, the OIRM is to decrypt said key blob using the embedded processor key and encrypt the data in the on-package memory using the decrypted key blob.

29. The system of claim 28, wherein the OIRM is to maintain an integrity check value array to store data corresponding to one or more pages of the OI memory partition, wherein each entry in the array is to indicate a secure hash algorithm value, a validity, and direct memory access of a corresponding page in the OI memory partition.

30. The system of claim 29, wherein the OIRM is to determine integrity of the one or more pages of the first partition based on values stored in a corresponding entry of the integrity check value array.

31. The system of claim 30, wherein the OIRM is to cause an update to a value stored in the integrity check value array in response to detection of a modification to a corresponding page of the OI memory partition.

* * * * *